United States Patent Office 3,401,095
Patented Sept. 10, 1968

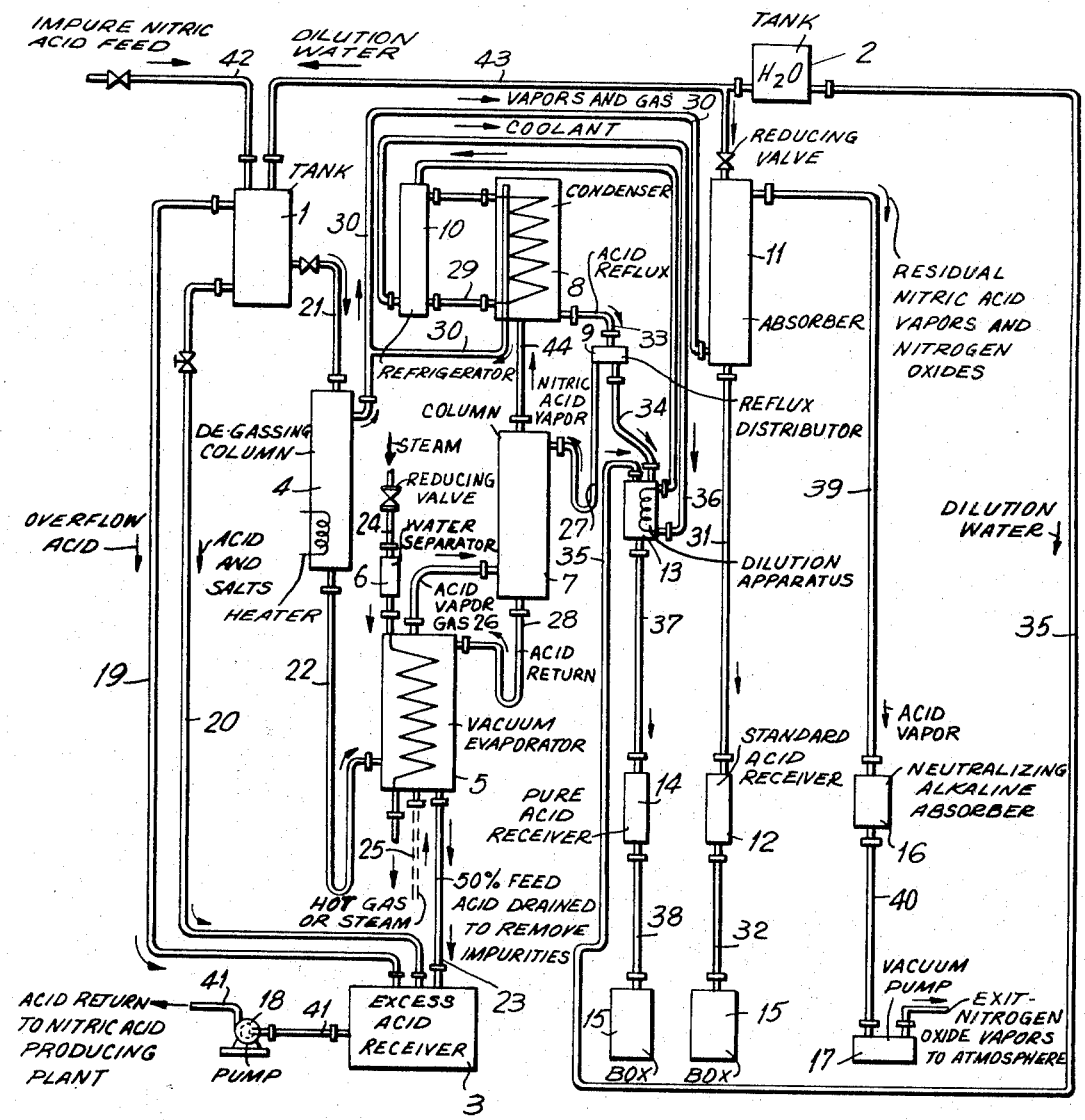

3,401,095
METHOD OF PURIFYING NITRIC ACID
Lev Vaagovich Saradzhev, Moscow, U.S.S.R., assignor to Gosudarstvenny Nauchno-Issledovatelsky i Proektny Institute azotnoi Promyshlennosti i Produktov Organicheskogo Sinteza
Filed July 21, 1964, Ser. No. 384,184
9 Claims. (Cl. 203—13)

ABSTRACT OF THE DISCLOSURE

A continuous method for rendering nitric acid free of gaseous impurities and solid (both metallic and nonmetallic) impurities dissolved therein. Nitric acid is heated under vacuum to degas it and thereafter rectified to yield the purified acid. In addition to evaporation and condensation, the rectification step involves scrubbing vaporized nitric acid with recycled liquid nitric acid from a subsequent step in the cycle.

---

This invention relates to a process for the purification of nitric acid.

Hitherto nitric acid has been purified by rectification in columns made of ferrosilicon, stainless steel, titanium, tantalum, etc. In this case a large quantity of impurities remains in the purified acid which is also contaminated with the products of corrosion of the materials of which the equipment is made.

The initial nitric acid contains impurities such as dissolved gases and nitrogen oxides as well as metal and nonmetal compounds carried over by vapor and gases from the liquid phase during the evaporation.

Columns used conventionally for the rectification of nitric acid are cumbersome and require complicated control of the operating conditions, said control being effected by varying the temperature and the number of plates.

In accordance with the requirements of modern industry for high purity nitric acid an object of the present invention is to develop a process for purifying nitric acid which provides for the production of high purity nitric acid, and makes it possible to avoid contamination of the acid during rectification with the products of corrosion of the materials used in the equipment employed.

Another object of the invention is to simplify the rectification process control.

In accordance with the aforementioned and other objects of the invention the proposed process for the purification of nitric acid involves the rectification of nitric acid after the gases dissolved in it are removed by heating. The process is carried out in equipment made of materials the corrosion of which does not affect the purity of the final product when said materials are attacked by nitric acid.

In effecting the proposed invention, changes and modifications can be made without departing from the spirit of the invention herein described.

Other objects and advantages of this invention will be apparent from the detailed description given below and the accompanying drawing.

The initial crude nitric acid may have any concentration and may be prepared by any process. The best results have been obtained with nitric acid produced by the direct synthesis method.

In order to reduce the entrainment of impurities during vaporization of nitric acid in the course of rectification and provide for more uniform vaporization, immediately before rectification, nitrogen oxides and other gases dissolved in the initial nitric acid are removed from it by heating, preferably under vacuum.

This makes it possible to increase the efficiency of the nitric acid rectification process.

Gases are removed from nitric acid at a pressure ranging from atmospheric to $10^{-4}$ mm. Hg, at a temperature corresponding to the boiling point of nitric acid at the pressure selected, preferably from 75 to 80° C.

This reduces the entrainment of impurities during the vaporization of nitric acid in the course of rectification and provides for the uniform vaporization of nitric acid.

The rectification process is a three step procedure comprising vaporization, vapor scrubbing with reflux obtained by the condensation of the purified nitric acid at the subsequent step of the rectification process, and condensation. Each step of the rectification process is carried out in a separate apparatus. This reduces the overall dimensions of the equipment for rectification and simplifies the rectification process control, since each step of the rectification process can be checked and controlled separately.

Nitric acid, from which dissolved gases have been removed at the boiling point of $HNO_3$, is vaporized at the same temperature as that used for removing gases from the acid at the boiling point of $HNO_3$. To avoid the accumulation of impurities in the evaporator, from 20 to 80 percent (preferably about 50 percent) of the nitric acid is drained. This prevents salt deposition on the evaporator surface and stabilizes vapor phase composition. Nitric acid is heated through heat transfer surfaces or by introducing steam, purified heated air, nitrogen, oxygen or inert gases directly into the acid.

Nitric acid vapor is scrubbed with reflux resulting from condensation of purified nitric acid during the third step of the rectification process.

The amount of reflux used for scrubbing the vapor is small, the reflux ratio being up to 10, preferably from about 0.3 to 3. The degree of nitric acid vapor condensation is controlled by varying the amount and temperature of the coolants being supplied. Condensation is carried out at a temperature of −10 to +60° C., the degree of condensation varying from 5 to 95 percent (preferably 90 percent).

To prevent contamination of nitric acid with corrosion products, the equipment is manufactured from or lined with glass, quartz (including high purity quartz), or polytetrafluoroethylene.

For a better understanding of the invention by those skilled in the art, a detailed description of the process, with reference to the accompanying drawing is given below.

Nitric acid is fed through conduit 42 into pressure tank 1, where it is diluted to the required concentration with water, preferably of high purity, supplied through conduit 43 from pressure tank 2. The level of the nitric acid in pressure tank 1 is kept constant, the excess acid being drained off through conduit 19 to acid receiver 3. Part of the acid containing salt deposits is drained from the bottom part of pressure tank 1 through conduit 20 to acid receiver 3.

From pressure tank 1 nitric acid flows along conduit 21 into column 4, where the acid is heated and inert gases and nitrogen oxides dissolved therein are removed. Next, by means of conduit 22, the acid is delivered to evaporator 5. Part of the acid from evaporator 5 is drained off into acid receiver 3 via conduit 23.

The acid in evaporator 5 is vaporized by steam supplied through conduit 24 via a reducing valve and spray catcher (water separator) 6 into a coil. The acid can also be vaporized by directly introducing steam or purified hot gases such as nitrogen and oxygen into it through the bottom part of evaporator 5 via conduit 25. The acid vapors flow from evaporator 5 through conduit 26 into column 7 of a packed or plate type wherein the aerosol particles carried over from evaporator 5 are removed from the acid. In column 7 the vapors are scrubbed with a certain amount of the acid reflux (scrubbing factor from 0.3 to 3) flowing from condenser 8 along conduit 33 through reflux distributor 9 and further via conduit 27.

The acid used for scrubbing the vapors in column 7 returns to evaporator 5 via conduit 28. The nitric acid vapors flow through conduit 44 to condenser 8, where the vapors are condensed and cooled by water or brine flowing through the condenser coil and delivered from cooler 10 via conduit 29.

The nitric acid vapors extracted from column 4 and not condensed in condenser 8 are delivered along conduit 30 to absorber 11 sprayed with high purity water for obtaining acid of standard purity, which is directed along conduit 31 into receiver 12 and further along conduit 32 for bottling in box 15. The acid obtained in condenser 8 is delivered along conduit 33, through reflux distributor 9 and further along conduit 34 to dilution apparatus 13 for preparation of pure nitric acid of the required concentration. The nitric acid is diluted with high purity water supplied from pressure tank 2 along conduit 35.

Dilution apparatus 13 is cooled through heat transfer surfaces with water or brine delivered along conduit 36 from cooler 10. The nitric acid flowing out of diluting apparatus 13 along conduit 37 is collected in receiver 14, when it is delivered via conduit 38 to boxes 15 for bottling into quartz or other containers.

The residual nitric acid vapors and nitrogen oxides discharged from absorber 11, together with the inert gases along conduit 39, are neutralized in alkaline absorbers 16, and along conduit 40 are fed to vacuum pump 17 through which they are discharged into the atmosphere. The acid from receiver 3 is returned by pump 18 along conduit 41 to the plant producing technical nitric acid.

The evaporators, condensers and scrub columns may be coil-type, diffuser-type or of other construction.

All the equipment used for carrying out the proposed process is made of glass, high purity quartz or polytetrafluoroethylene.

Example 1

56.5 kg. per hour of crude nitric acid containing the following impurities:

| | |
|---|---|
| Al | $7 \times 10^{-4}$ |
| Fe | $2.5 \times 10^{-3}$ |
| Mn | $3.3 \times 10^{-5}$ |
| Cu | $1 \times 10^{-4}$ |
| Ni | $3 \times 10^{-4}$ |
| Pb | $2 \times 10^{-4}$ |
| SO$_4$ | $4 \times 10^{-3}$ |
| Cr | $5 \times 10^{-4}$ |
| Non-volatile residue | $6.5 \times 10^{-2}$ |

NO$_2$ concentration being 0.7 percent,
HNO$_3$ concentration being 98.7 percent,
is fed at a temperature of 18° C. from pressure tank 1 in accordance with the detailed description of the process as hereinabove given to column 4, where dissolved gases are removed from the nitric acid. The nitric acid at a temperature of 78° C. is thereafter fed to evaporator 5, where it is vaporized in a vacuum through heat exchange with condensation steam passing through a coil under a pressure from 1 to 3 atmospheres.

78 kg. per hour of nitric acid is also fed to the evaporator 5 from the nitric acid vapor scrub column 7 at a temperature of 78° C. The total amount of nitric acid introduced to the evaporator is 134 kg. per hour.

To prevent the accumulation of impurities in the vaporized nitric acid and to stabilize its concentration, 23 kg. per hour of nitric acid is drained from the evaporator 5 at a temperature of 52° C.

From the evaporator 5, the nitric acid vapor at a rate of 111 kg. per hour enters the scrub column 7 at a temperature of 78° C., where it is sprayed with the acid fed from the condenser 8.

From the condenser 8, 75 kg. per hour of acid (at a temperature of 26° C.) is fed to the scrub column 7. The acid vapor leaves the scrub column 7 at a rate of 108 kg. per hour and enters the condenser 8 at a temperature of 77° C.

The acid obtained in the condenser 8 is fed to a reflux distributor 9, the gaseous phase being connected with a vacuum pump and the liquid phase being connected with a distributor 9, which regulates the acid distribution to the scrub column 7, to the packaging system or to the system for dilution to the desired concentration prior to packaging.

The processes of degassing, boiling, refluxing and condensation are conducted under a vacuum of 560 mm. Hg residual pressure.

There was obtained from the process nitric acid containing the following impurities:

| | |
|---|---|
| Al | $<1 \times 10^{-5}$ |
| Fe | $<1 \times 10^{-5}$ |
| Mn | $<1 \times 10^{-5}$ |
| Cu | $<1 \times 10^{-5}$ |
| Ni | $<1 \times 10^{-5}$ |
| Pb | $<1 \times 10^{-5}$ |
| SO$_4$ | $<1 \times 10^{-4}$ |
| Cr | $<1 \times 10^{-5}$ |
| Non-volatile residue | $<3 \times 10^{-4}$ |

The HNO$_3$ concentration being supplied as required by the consumer; NO$_2$ concentration being 0.1 percent.

Example 2

From a pressure tank, 91 kg. per hour of crude nitric acid containing the following impurities:

| | |
|---|---|
| Al | $2 \times 10^{-3}$ |
| Fe | $1 \times 10^{-3}$ |
| Mn | $6 \times 10^{-4}$ |
| Cu | $1 \times 10^{-4}$ |
| Ni | $2.7 \times 10^{-4}$ |
| Pb | $5 \times 10^{-3}$ |
| SO$_4$ | $1.6 \times 10^{-5}$ |
| Cr | $6 \times 10^{-5}$ |
| Non-volatile residue | $4.7 \times 10^{-2}$ |

NO$_2$ 0.65%, and the HNO$_3$ concentration being 98.7%, is fed at a temperature of 14° C., from the pressure tank to column 4 from which the degassed acid at a temperature of 80° C. is introduced to evaporator 5 where it is vaporized under vacuum in a heat exchange with condensing steam passing through a coil under a pressure of 1.2 atmospheres.

The evaporator 5 is also fed with 67 kg. per hour of nitric acid from the nitric acid scrub vapor column 7 at a temperature of 63° C. The total amount of nitric acid introduced is 157 kg. per hour.

To prevent the accumulation of impurities in the vaporized nitric acid and to stabilize its concentration 27 kg. per hour of nitric acid at a temperature of 80° C. is drained from the evaporator 5.

From the evaporator 5 the nitric acid vapor at a rate of 130 kg. per hour enters the scrub column 7 at a temperature of 80° C., where it is sprayed with the acid fed from the condenser 8.

From the condenser 8, 64 kg. per hour of acid at a temperature of 35° C. is fed to the scrub column 7. Acid vapor from the scrub column 7, at a rate of 127 kg. per hour, enters the condenser 8, at a temperature of 74° C.

The acid obtained in the condenser 8 is fed to a reflux distributor 9, the gaseous phase being connected with a vacuum-pump and the liquid phase being connected with a distributor 9, which regulates the acid distribution to the scrub column 7, to the packaging system or to the system for dilution to the desired concentration prior to packaging.

The processes of degassing, boiling, refluxing and condensation are conducted under vacuum of 580 mm. Hg residual pressure.

There was produced nitric acid containing the following impurities.

| | |
|---|---|
| Al | $<1\times10^{-5}$ |
| Fe | $<1\times10^{-5}$ |
| Mn | $<1\times10^{-5}$ |
| Cu | $<1\times10^{-5}$ |
| Ni | $<1\times10^{-5}$ |
| Pb | $<1\times10^{-4}$ |
| $SO_4$ | $<1\times10^{-5}$ |
| Cr | $<1\times10^{-5}$ |
| Non-volatile residue | $<3\times10^{-4}$ |

$NO_2$ concentration 0.1 percent

The $HNO_3$ concentration being supplied as desired by the consumer.

What is claimed is:

1. A continuous method for the purification of nitric acid from microimpurities contained therein, said method comprising diluting the nitric acid, removing dissolved and gaseous impurities from the thus diluted nitric acid, the removal being effected first by heating the starting acid to degas it, then evaporating the degassed nitric acid to convert a portion thereof to the vapor phase, the remaining portion of said acid being continuously drained to prevent impurity accumulation in the nitric acid being vaporized and to stabilize the liquid and the vapor phase; scrubbing the vapor phase with reflux comprised of a part of recycled, condensed, purified nitric acid, the nitric acid vapor being partly condensed on the microimpurities entrained from the liquid phase; condensing the scrubbed nitric acid vapor to yield the desired product, and recycling a part of said product as said reflux.

2. A method according to claim 1, wherein the boiling is effected at an absolute pressure of from $10^{-4}$ to 760 mm. Hg to minimize thermal decomposition of nitric acid.

3. A method according to claim 1, wherein 50–80% of the nitric acid stock is drained during the evaporating step to stabilize the amount of impurities and compounds in the liquid and the vapor phase.

4. A method according to claim 1, wherein the nitric acid vapors formed in the course of nitric acid evaporation are refluxed with a part of the purified liquid nitric acid recycled from the condensation zone, the reflux-to-product ratio being in the range of from 0.1 to 10, said vapors being freed from microimpurities due to nitric acid vapor condensation on said impurities in the course of vapor scrubbing with the reflux.

5. A method according to claim 1, wherein from 5 to 95% of the total amount of the scrubbed vapor phase undergoes condensation in order to prevent excessive accumulation of microimpurities in the finished product.

6. A method according to claim 1, comprising forming the equipment wherein the nitric acid purification steps are effected, of high purity materials that resist the attack of high purity nitric acid.

7. A method according to claim 6, wherein said materials are high purity silica or polytetrafluoroethylene in which the content of impurities is not greater than that in the end product.

8. A method according to claim 1, wherein evaporation of the degassed nitric acid is effected by heat exchange thereof with a heat carrier selected from the group consisting of steam, heated air, heated oxygen, and heated nitrogen.

9. A method according to claim 8, wherein the evaporation of the degassed nitric acid is effected by bringing the acid in direct contact with said heat carrier.

References Cited

UNITED STATES PATENTS

| | | | |
|---|---|---|---|
| 2,463,453 | 3/1949 | Beardsley | 203—13 |
| 2,761,761 | 9/1956 | Congdon et al. | 23—160 |
| 2,990,341 | 6/1961 | Graybell | 203—86 X |
| 3,106,515 | 10/1963 | Williams | 203—86 X |
| 3,161,574 | 12/1964 | Elam | 203—86 X |
| 3,202,481 | 8/1965 | Bradley et al. | 23—159 |
| 3,206,381 | 9/1965 | Neugebauer et al. | 203—10 X |
| 3,250,687 | 5/1966 | Frank | 203—86 X |
| 1,379,260 | 5/1921 | Hansen | 23—161 |

FOREIGN PATENTS 281,642   8/1928   Great Britain.

OTHER REFERENCES

"Chemical Engineer's Handbook," J. H. Perry, 3rd edition, McGraw-Hill, 1950, New York, pp. 1502–1503.

"Fundamentals of Chemistry," M. M. Offner, Barnes & Noble, New York, 1947, pp. 211, 373.

NORMAN YUDKOFF, *Primary Examiner.*

J. F. SOFER, *Assistant Examiner.*